(12) United States Patent
Huang

(10) Patent No.: US 11,264,775 B2
(45) Date of Patent: Mar. 1, 2022

(54) DISCRIMINATIVE REMOTE SENSING AND SURFACE PROFILING BASED ON SUPERRADIANT PHOTONIC BACKSCATTERING

(71) Applicant: THE TRUSTEES OF THE STEVENS INSTITUTE OF TECHNOLOGY, Hoboken, NJ (US)

(72) Inventor: Yuping Huang, Norwood, NJ (US)

(73) Assignee: THE TRUSTEES OF THE STEVENS INSTITUTE OF TECHNOLOGY, Hoboken, NJ (US)

(*) Notice: Subject to any disclaimer, the term of this patent is extended or adjusted under 35 U.S.C. 154(b) by 0 days.

(21) Appl. No.: 17/077,878

(22) Filed: Oct. 22, 2020

(65) Prior Publication Data
US 2021/0111532 A1    Apr. 15, 2021

Related U.S. Application Data

(63) Continuation of application No. 16/741,507, filed on Jan. 13, 2020, now Pat. No. 10,819,081, which is a
(Continued)

(51) Int. Cl.
*H01S 3/094*    (2006.01)
*G02B 27/09*    (2006.01)
(Continued)

(52) U.S. Cl.
CPC ...... *H01S 3/094076* (2013.01); *G01S 7/4802* (2013.01); *G01S 17/00* (2013.01);
(Continued)

(58) Field of Classification Search
CPC ........ G01S 7/484; G01S 17/74; H01S 5/0057; H01S 5/0085; H01S 5/0092;
(Continued)

(56) References Cited

U.S. PATENT DOCUMENTS 5,850,285 A * 12/1998 Hill, Jr. ............... G01N 21/63
                                                       356/311
8,665,923 B2 * 3/2014 Sprangle ............... H01S 3/104
                                                       372/70

* cited by examiner

*Primary Examiner* — Michael Carter
(74) *Attorney, Agent, or Firm* — Lewis Roca Rothgerber Christie LLP

(57) ABSTRACT

Disclosed is a system and method for remote sensing, surface profiling, object identification, and aiming based on two-photon population inversion and subsequent photon backscattering enhanced by superradiance using two co-propagating pump waves. The present disclosure enables efficient and highly-directional photon backscattering by generating the pump waves in properly pulsed time-frequency modes, proper spatial modes, with proper group-velocity difference in air. The pump waves are relatively delayed in a tunable pulse delay device and launched to free space along a desirable direction using a laser-pointing device. When the pump waves overlap in air, signal photons will be created through two-photon driven superradiant backscattering if target gas molecules are present. The backscattered signal photons propagate back, picked using optical filters, and detected. By scanning the relative delay and the launching direction while the signal photons are detected, three-dimensional information of target objects is acquired remotely.

36 Claims, 6 Drawing Sheets

Related U.S. Application Data continuation of application No. 15/673,666, filed on Aug. 10, 2017, now Pat. No. 10,535,974.

(60) Provisional application No. 62/373,625, filed on Aug. 11, 2016.

(51) Int. Cl.

| | |
|---|---|
| *H01S 3/11* | (2006.01) |
| *H01S 3/00* | (2006.01) |
| *G01S 7/48* | (2006.01) |
| *G01S 17/00* | (2020.01) |
| *G01S 17/95* | (2006.01) |
| *G01S 17/88* | (2006.01) |
| *H01S 3/30* | (2006.01) |
| *H01S 3/067* | (2006.01) |
| *H01S 3/16* | (2006.01) |

(52) U.S. Cl.
CPC .............. *G01S 17/88* (2013.01); *G01S 17/95* (2013.01); *G02B 27/0977* (2013.01); *H01S 3/0085* (2013.01); *H01S 3/0092* (2013.01); *H01S 3/094042* (2013.01); *H01S 3/11* (2013.01); *H01S 3/0057* (2013.01); *H01S 3/06758* (2013.01); *H01S 3/1608* (2013.01); *H01S 3/305* (2013.01)

(58) Field of Classification Search
CPC .......... H01S 5/06758; H01S 5/094042; H01S 5/094073; H01S 5/1608
See application file for complete search history.

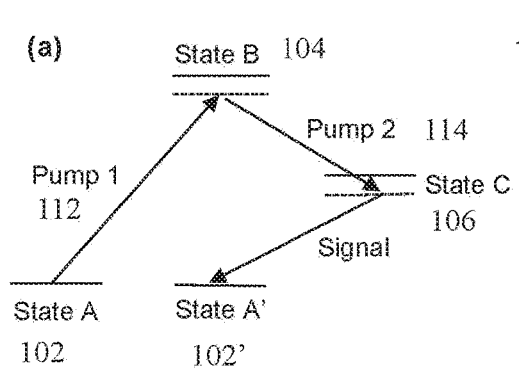
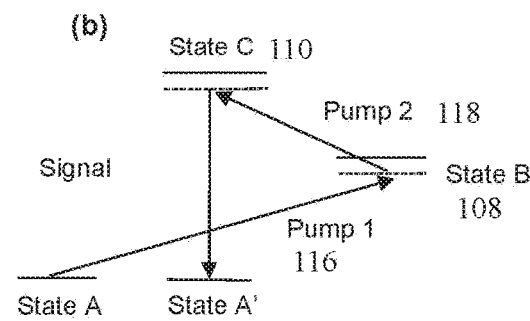
FIG. 1a
FIG. 1b
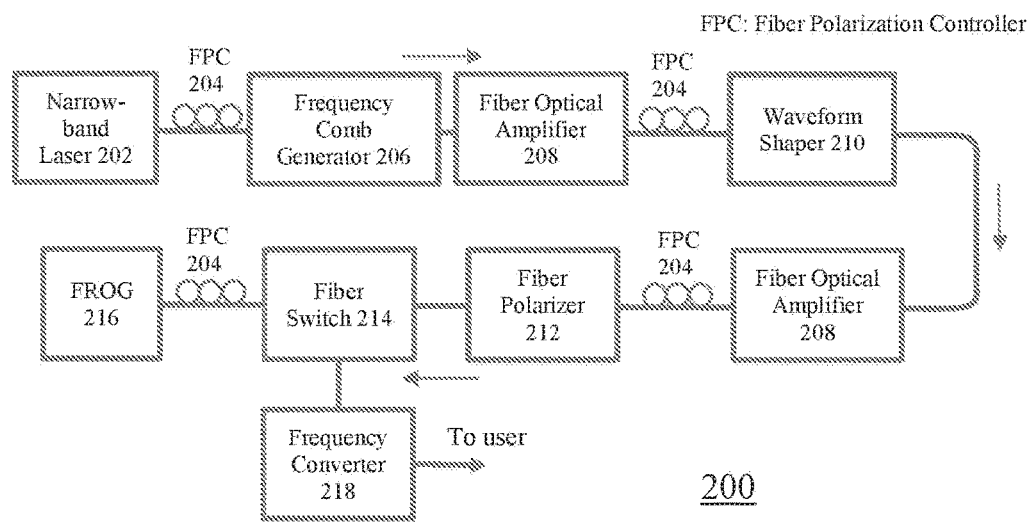
FIG. 2

500

600

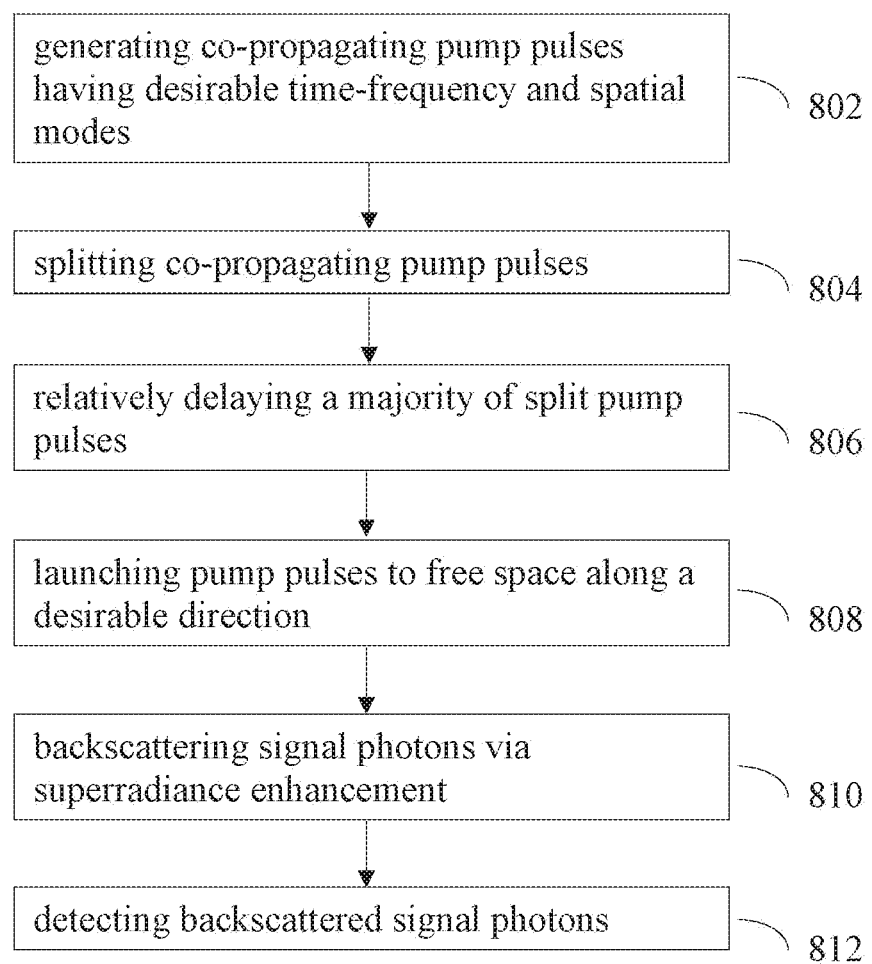

DISCRIMINATIVE REMOTE SENSING AND SURFACE PROFILING BASED ON SUPERRADIANT PHOTONIC BACKSCATTERING

CROSS-REFERENCE TO RELATED APPLICATIONS

This application is a continuation of U.S. patent application Ser. No. 16/741,507 filed Jan. 13, 2020, now U.S. Pat. No. 10,819,081, which is a continuation of U.S. patent application Ser. No. 15/673,666 filed Aug. 10, 2017, now U.S. Pat. No. 10,535,974, which claims the benefit of U.S. Provisional Patent Application No. 62/373,625 filed Aug. 11, 2016, the entire disclosures of which are incorporated herein by reference.

RELATED APPLICATION

This is a Section 111(a) application relating to and claiming the benefit of U.S. Provisional Patent Application No. 62/373,625, filed Aug. 11, 2016, the disclosure of which is incorporated by reference in its entirety herein.

FIELD OF INVENTION

The present disclosure generally relates to remote sensing, surface profiling, object identification, and aiming based on two-photon population inversion and subsequent photon backscattering via superradiance using optimized pump pulses.

BACKGROUND

Air pollution represents an increasing threat to the sustainable development of our society. As polluted gases are generated and emitted from various and dynamic sources, it is challenging, costly, and sometimes impossible, to monitor and measure the type and degree of air pollution using existing approaches that rely on on-site detection and/or in-lab tests.

In events of emergency, such as a gas explosion, it is vital to be able to get accurate information on the gaseous constituents, concentration, and distribution in short time (such as in seconds), from safe distance (such as 10 miles in warfare), and without false alarm. None of existing remote sensing/detection techniques can offer such needed capabilities simultaneously, in terms of low false alarm, high sensitivity, long distance, and high spatial resolution.

Existing radio detection and ranging (RADAR) (or light detection and ranging, i.e., LiDAR) is based on radio waves (or light waves) reflected off the object surfaces. They are thus incapable of or inefficient in detecting objects with absorptive surfaces, such as stealth aircrafts. In addition, while LiDAR offers high spatial resolution, the detection range is limited because the light reflection is in general not directed, so that the returning light signal drops quadratically as the range increases.

Raman-based LiDAR systems need to use high power laser to create frequency-shifted signals. However, because the spontaneous Raman scattering process is not directional, the returning signal drops quadratically with the detection distance. As a result, the application range of LiDAR is limited.

SUMMARY

The present invention relates to systems and methods for remote sensing, surface profiling, object identification, and aiming based on two-photon population inversion and subsequent photon backscattering via superradiance using optimized pump pulses. In an embodiment, the present invention enables scanning the three-dimensional space and time of photon backscattering by laser pointing and timing the launching of pump pulses driving the two-photon population inversion. Because the backscattering is sensitive to the signature level structures of gaseous molecules, real-time 3D tomography of chemical gases can be realized for different gas types over long distances, such as 10 km. This can be used for environmental applications such as remotely identifying and quantifying emission of polluted and toxic gases, quickly assessing the level of air pollution in a city, and continuous monitoring gas exhaust from a factory. It can also be deployed during emergent events, as the remote sensing is fast.

In accordance with one or more embodiments, the present invention relates to a "negative imaging" method to perform remote surface profiling of stealth objects with reduced or non-reflection of radio and light waves by detecting the sudden drop in the amount of detected backscattered signal photons when the backscattering is scanned by the laser pointing and time delaying for a certain common atmosphere constituent, such as oxygen, carbon dioxide, and nitrogen. In accordance with one or more embodiments, the present invention utilizes spatial mode modulator to perform surface profiling and object identification beyond line of sight by creating pump pulses in spatial modes capable of self-deflection, i.e., with their intensity peaks propagating along a curved trajectory that obviate from a straight line in free space, without use of any external optical devices. In accordance with one or more embodiments, the present invention utilizes self-deflection Airy beams to simulate the bullet trajectory in the presence of gravity so that directly aiming at distant objects can be realized without the need for computing the gravitational bullet drop. In accordance with one or more embodiments, robust surface profiling and project identification can be realized under low visibilities or direct image distortions.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 1a is a schematic diagram illustrating an example of a quantum transition for a two-photon driven superradiant backscattering of a Stokes photon whose wavelength is longer than the pump waves according to some embodiments of the present invention;

FIG. 1b is a diagram showing a quantum transition for a two-photon driven superradiant backscattering of an anti-Stokes photon whose wavelength is shorter than the pump waves according to some embodiments of the present invention;

FIG. 2 is a schematic diagram illustrating an example of an Optical Arbitrary Waveform Generator ("OAWG") setup for creating pump pulses in the desirable time-frequency profiles according to some embodiments of the present invention;

FIG. 8 is a flowchart illustrating steps performed according to some embodiments of the present invention.

DETAILED DESCRIPTION OF EXEMPLARY EMBODIMENTS

Figure 3:
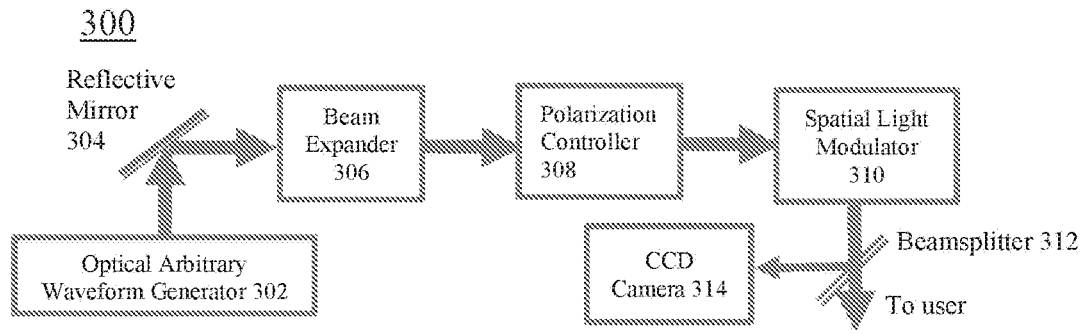
FIG. 3 is a schematic diagram illustrating an example of a system for generating pump pulses in optimized time-frequency and spatial waveforms using the OAWG shown in FIG. 2 according to some embodiments of the present invention.

Reference will now be made to several embodiments of the present invention(s), examples of which are illustrated in the accompanying figures. Wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

All terms defined herein should be afforded their broadest possible interpretation, including any implied meanings as dictated by a reading of the specification as well as any words that a person having skill in the art and/or a dictionary, treatise, or similar authority would assign thereto.

The terms, "for example", "e.g.", "optionally", as used herein, are intended to be used to introduce non-limiting examples. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on." In addition, the terms "comprises" and "comprising" when used herein specify that certain features are present in that embodiment, however, this phrase should not be interpreted to preclude the presence or additional of additional steps, operations, features, components, and/or groups thereof.

The present disclosure generally relates to two-photon population inversion and superradiant photon backscattering in gaseous molecules. In one embodiment, superradiance occurs when a group of N emitters collectively interact with light waves in a coherently constructive manner, with the result that the radiation intensity along certain directions is enhanced by a factor proportional to N. In order to satisfy the condition for superradiance along the backscattering direction, the present disclosure creates an optimized phase and amplitude profiles for Pump 1 and Pump 2 using OAWG as described below in details. In one embodiment, the optimization is performed using a global searching algorithm based on line-by-line modulating the phase and amplitude of the frequency comb lines. In one embodiment, an optimization involves recursive steps, each starts with certain waveforms for the pump waves and randomly changes the amplitude and phase of each comb line that forms the waveforms. At the very beginning of the optimization process, either generic waveforms-such as Gaussian-shaped waveforms— or reasonable waveforms based on prior knowledge can be assumed. The resulting waveforms are tested to check if they enhance the backscattering or not, as compared with the original waveforms. In one embodiment, the testing is performed numerically, by solving the dynamics of the optical transitions in FIG. 1*a* or 1*b* for the given pump pulses created in the OAWG. In another embodiment, the testing is performed experimentally, by measuring the backscattering from a sample of the target gas. For either testing methods, the random changes are accepted and pumps' waveforms are updated if the backscattering is enhanced and rejected otherwise. This step is applied recursively until reaching the desirable backscattering strength, upon which the optimized waveforms are obtained.

Schematics of quantum transitions for those processes are shown in FIG. 1 according to some embodiments. In some embodiments, such transitions exist in gaseous molecules, and the disclosed techniques can be generally applied to a wide range of atmosphere constituents and chemical gaseous compounds.

In some embodiment, the quantum transitions start with molecules being initially in the ground state A 102, which is the electronic ground state of the target molecules or a quantum state the molecules predominantly occupy under ambient conditions, such as at 100 kPa (1 bar) pressure, 290 kelvin temperature, 10 miles per hour wind speed, and 30 grams per cubic meter humidity level of the atmosphere in the target space. In some embodiment, depending on the molecule type and temperature of the gas, ground state A 102 may contain a collection of vibrational and rotational quantum sub-levels, as dedicated by the Boltzman law of thermal distribution. However, when the applied lasers have broad spectral band of between 0.1 THz to 10 THz, the rotational levels of ground state A 102, which typically have narrow spectral spacing in the range between 1 to 100 GHz, will respond as a single effective state. In some embodiment, the broad laser spectral band is between 0.1 THz to 10 THz. In some embodiment, spectral band of the rotational levels ground state A 102 is between 1 to 100 GHz.

In the two-photon driven Stokes backscattering shown in FIG. 1*a*, according to some embodiments, Pump 1 112 and Pump 2 114 implement two-photon transition to efficiently transform population from the ground State A 102, where molecules initially reside under ambient conditions, to an excited State C 106, through an intermediate State B 104. The State C may have zero, positive, or negative detuning from the energy level of an eigenstate of the molecule. In some embodiment, Pump 2 114 is of high intensity of between 10 KW/m² to 100 MW/m² such that it creates a Rabi oscillation between State B 104 and State C 106, whose characteristic time scale is significantly shorter than the lifetime of State B 104. In some embodiment, the Rabi oscillation characteristic time scale is between 10 nanosecond to 10 picosecond. In some embodiment, the lifetime of State B 104 is between 1 microsecond to 0.1 nanosecond. Under this condition, Pump 1 112 and Pump 2 114 are designed such that State B 104 is only virtually populated during the population transfer, i.e., its fractional population remains negligible. In some embodiment, when Pump 2 114 is absent, excitation of molecules from State A 102 is negligible as Pump 1 112 alone is not on resonance with any transition. In some embodiment, when Pump 1 112 is absent, there is also no transition between State B 104 and State C 106 because under ambient conditions almost all molecules are in State A 102 and nearly none is in State B 104.

Once the molecules are in State C 106, they will decay to a lower energy State A' 102' by emitting signal photons. The State A' 102' will be at the same electronic ground level as State A 102, but may or may not be at the same vibrational and rotational quantum levels. When the State A' 102' is at the same vibrational and rotational quantum levels, it becomes identical to State A 102. In this level transition scheme, each signal photon has less energy, thus longer wavelength, than photons in Pump 1 112, but may have more, equal, or less energy than photons in Pump 2 114. The generation of signal photons starts with spontaneous emission of a molecule in State C 106, which is omnidirectional. It is then followed by superradiant emission with enhanced emission rate, where the emitted photons will interact with other molecules in State C 106 and cause additional photons to be emitted at an enhanced rate into the same mode, i.e., with the same phase, mode shape, and emission direction. This is a manifestation of the boson simulation effect, and is only effective when the molecular dipole moment, i.e., the coherence between State C 106 and A' 102'—which is created by Pump 1 112 and Pump 2 114—is in phase with the incident photons. To realize this superradiance effect, Pump 1 112 and Pump 2 114 are each prepared in appropriate amplitude and phase profiles so that the backscattering occurs at high efficiency along one direction only, the reversal of Pump 1 112 and Pump 2 114. The entire process is thus termed as two-photon driven superradiant backscattering.

FIG. 1*b* shows the quantum transitions for the two-photon driven superradiant backscattering of antiStoke photons according to some embodiments. It shares the same principle with the above Stokes backscattering. The difference is that, in one embodiment, State C 110 is at a higher energy level than State B 108, so that the emitted signal photons will have higher energy than Pump 1 116 and Pump 2 118. In one embodiment, Pump 1 116 and Pump 2 118 have the same wavelength. In one embodiment, Pump 1 116 and Pump 2 118 do not have the same wavelength.

In some embodiments, Pump 1 116 and Pump 2 118 are created in the optimized time-frequency and spatial modes by using an Optical Arbitrary Waveform Generator (OAWG) and a Spatial Light Modulator (SLM) sequentially. FIG. 2 shows a typical realization of OAWG according to some embodiments. Other realizations are possible and can be used equivalently to generate the same optical pulses. In one embodiment, a continuous-wave laser beam with a typical bandwidth between 1 KHz to 1 MHz is generated by a Narrowband Laser Device 202. The laser beam (not shown) is passed through a Fiber Polarization Controller (FPC) 204 and then modulated by a Frequency Comb Generator 206 (Model: Optical Comb Generator WTAS-02, Manufacturer: Optical Comb, Inc., Tokyo, Japan) to create optical frequency combs with equal spectral spacing. The combs are amplified through a Fiber Optical Amplifier 208. In one embodiment, the Fiber Optical Amplifier 208 with wavelengths in the telecom C-band is an erbium-doped fiber amplifier (EDFA). The laser pulses are passed through a FPC 204 and then into a Waveform Shaper 210 (Model: 16000S, Manufacturer: Finisar, Sunnyvale, Calif.) where the amplitude and phase of each comb line is modulated individually and multiplexed at a single output to create pump pulses in the desired phase and amplitude profiles. The output pump pulses (not shown) are amplified through a Fiber Optical Amplifier 208 and passed through a FPC 204 and then into a Fiber Polarizer 212. In one embodiment, the Fiber Polarizer 212 pick up only pump pulses in the desirable polarization. The picked pump pulses are passed through a Fiber Switch 214, with some output pump pulses exported to FPC 204 and then a frequency-resolving optical gating (FROG) 216 (manufacturer: Coherent Solutions Ltd, Auckland, New Zealand), and the other output pump pulses exported to a Frequency Converter 218. In one embodiment, the FROG 216 measures the phase and amplitude profiles of the output pump pulses. In one embodiment, the Frequency Converter 218 transduces the generated pulses to a desirable carrier frequency or the central wavelength. In one embodiment, desirable carrier frequency is between $3*10^{13}$ Hz to $3*10^{15}$ Hz. (Central wavelength between 0.1 micron to 10 micron.) In one embodiment, by mixing the created pulses centering at 1550 nm with a continuous-wave 900-nm laser in a nonlinear waveguide for difference frequency generation, new pulses in the same phase and amplitude profile have a center wavelength at around 2146 nm. In one embodiment, depending on the stability of the entire system, the switch periodically directs the output pump pulses to the FROG 216 to verify their phase and amplitude profiles. In one embodiment, the FROG further sends feedback to the Waveform Shaper 210 to correct the modulation for individual comb lines.

FIG. 3 describes an example of a system for generating pump pulses in optimized time-frequency and spatial waveforms using the OAWG shown in FIG. 2 according to some embodiments. In order to create pump pulses that are modulated in both time-frequency and spatial domains, the output of OAWG 302 is sent to a Spatial Light Modulator 304 such as "Spatial Light Modulator, SLM-100" made by the SANTEC CORPORATION. In one embodiment, the beam (not shown) coming out of the OAWG 302 and reflected by a Reflective Mirror 304 is first expanded through a Beam Expander 308 and passed through a Polarization Controller 308 in free space to obtain the correct polarization for the Spatial Light Modulator 304. In one embodiment, at least one of the beam's phase and amplitude profiles are modulated pixel by pixel in the Spatial Light Modulator 304. In one embodiment, the modulated beam is then split at a Beamsplitter 312, with most light goes to the user and a small fraction goes to a Charge-Coupled Device ("CCD") camera 314 to verify the spatial modulation.

Figure 4A:
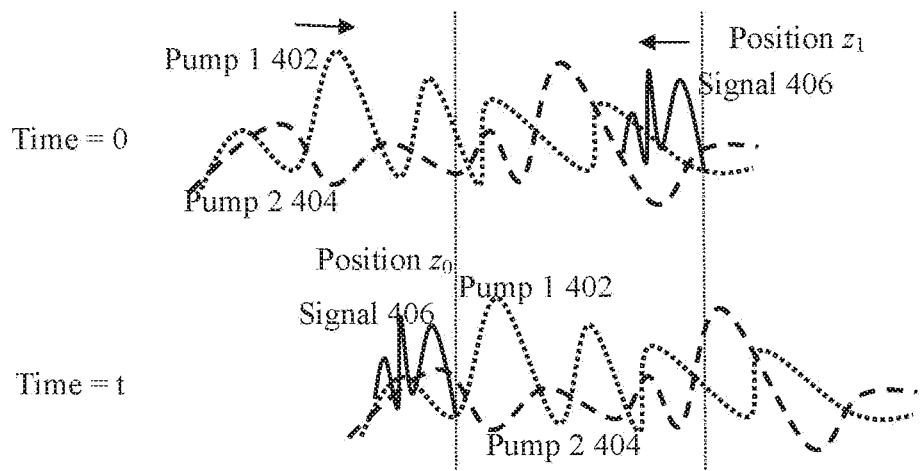
FIG. 4*a* is a schematic diagram illustrating an example of superradiant backscattering according to some embodiments of the present invention.

Once the optimum amplitude and phase profiles are obtained, a similar optimization procedure is performed to optimize the operation of the Spatial Light Modulator for delivering the maximum optical power with the target area over distance. FIG. 4*a* describes an example of superradiant backscattering in the three-wave mixing configurations as illustrated in FIG. 1 according to some embodiments. In one embodiment, two pump waves, Pump 1 and Pump 2, excite the gas molecules in atmosphere to State C (not shown), which then decay to State A (not shown) by emitting signal photons. A waveform of Pump 1 402, a waveform of Pump 2 404, and a waveform of Signal 406 are represented illustratively as dotted, dashed, and solid lines, respectively. In one embodiment, at time 0, Pump 1 402 and Pump 2 404 create a backscattered signal photon at position $z_1$ via spontaneous emission. At time t, Pump 1 402 and Pump 2 404 have travelled forward, i.e., from position $z_0$ to position $z_1$, for a distance of c*t, where c is the speed of light in atmosphere. The scattered photon of Signal 406 has travelled for about the same distance, but backwardly, arriving at positon $z_0$. In some embodiment, if the net coherence between State C and State A, which is generated in the gas molecules by Pump 1 402 and Pump 2 404 at position $z_0$ till time t, is in phase with the backscattered signal photon created earlier at $z_1$ and now arriving at $z_0$, the signal photon will stimulate emission of more photons by the molecules at $z_0$ into the same mode. In some other embodiment, if the coherence is out of phase, the signal emission will be suppressed, with a possibility that the signal is re-absorbed by the gas molecules. By carefully designing the phase and amplitude profiles of Pump 1 402 and Pump 2 404, the in-phase coherence along the backscattering path is generated overwhelmingly, thereby achieving superradiant backscattering. As a result, the photon emission is greatly enhanced and occurs significantly along the backscattering direction, as comparing with other scattering directions. In the embodiments as described above, the in-phase coherence is not required to be generated everywhere along the backscattering path. Rather, its aggregated effect needs to predominate that of its opposite counterpart, the out-phase coherence. In the context of nonlinear optics, the condition of in-phase coherence is manifested as phase matching, whereby nonlinear optical processes are efficient as the nonlinear interaction of light waves constructively builds up in the nonlinear media.

Figure 4B:
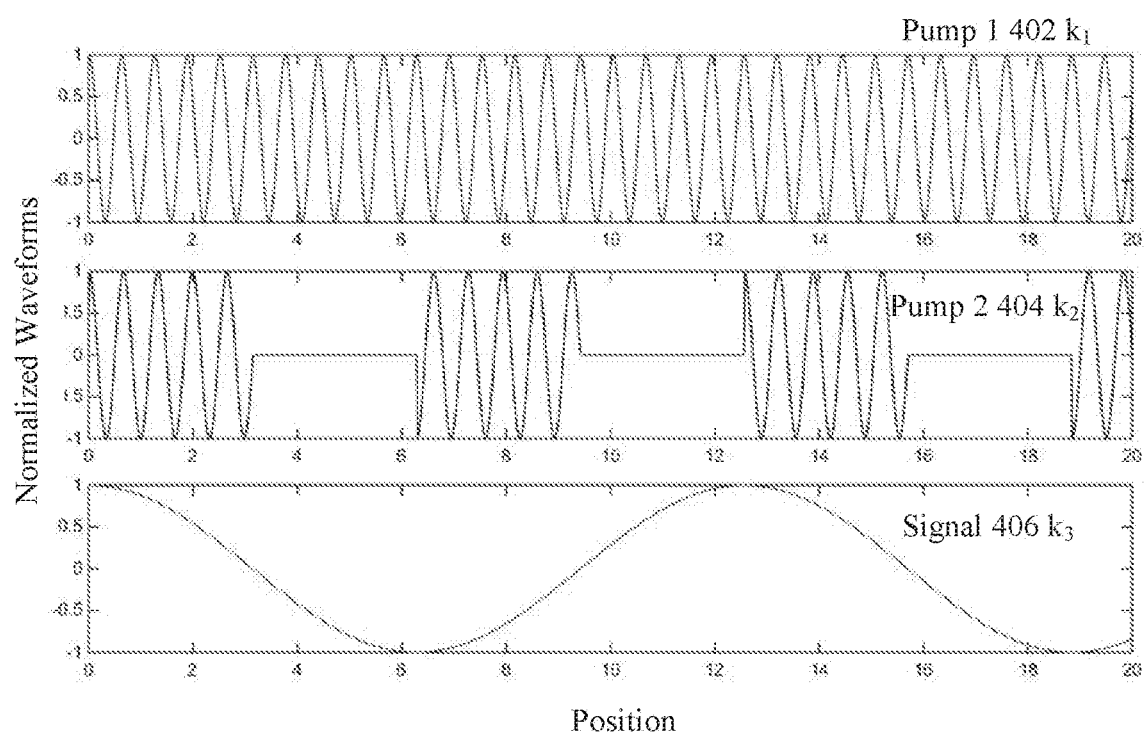
FIG. 4*b* is a schematic diagram illustrating an example of the waveforms of the pump and signal waves that allow the superradiant backscattering of Stokes photons as shown in FIG. 1*a* according to some embodiments of the present invention.

FIG. 4b describes an example of the superradiant backscattering of the three-wave mixing process according to some embodiments. The example considers a level structure exhibited in FIG. 1a, where two forward-propagating Pump waves, Pump 1 402 and Pump 2 404, create transient excitations of the gas molecules in State C through the two-photon transition. Pump 1 402 and Pump 2 404 propagate along the z direction with wavenumber $k_1$ and $k_2$, respectively, with $k_1 > k_2$, and are represented by the waveforms shown in the top and middle chart of FIG. 4b. The transient excitations decay back to State A almost instantaneously, i.e., at a time scale much shorter than any other characteristic time scale for the whole process, during which signal photons are generated with wavenumber $k_3$. The signal 406 photons' waveform is represented in the bottom chart of FIG. 4b. Assuming Pump 1 402, Pump 2 404, and the signal 406 to propagate at the same speed, which is a good approximation for the earth's atmosphere, the energy conservation of this process requires $k_3 = k_1 - k_2$. As a result, for the backscattering, the phase matching condition is not naturally satisfied, i.e., $k_1 - k_2 + k_3 = -2k_3$ not equal zero. In some embodiments, the backscattered photons at position z bear a phase factor proportional to $\exp(-2*i*k_3*z)$, where i is the imaginary unit. This will prevent the superradiant backscattering from constructively building up, as the coherence between State C and A varies periodically from in-phase to out-phase along the backscattering path. The in-phase and out-phase coherences act against each other to cancel the superradiance effect. To overcome this deficiency, the present disclosure provides, in one embodiment, a process to modulate Pump 2 404 to form a periodic, square-wave-like waveform structure with spatial periodicity $pi/k_3$, where pi is a mathematical constant, whose value is approximately 3.14159. This structure is illustrated in the center chart of FIG. 4b, where the amplitude of Pump 2 404 is modulated to zero for every other spatial interval, each with equal length of $pi/2k_3$. In this way, the out-phase coherence is eliminated, as there is no transient excitation in those intervals where the amplitude of Pump 2 is zero. By only having in-phase coherence along the backscattering path, the superradiant backscattering becomes effective. The backscattering coefficient is a 1/pi fraction of that for perfect phase matching case with $k_1 - k_2 + k_3 = 0$. Based on the same idea of suppressing out-phase coherence, other forms of modulation are feasible and may give a higher backscattering coefficient.

In some embodiments, the pump waves are modulated. The two-photon quantum transition, hence the photon backscattering, is sensitive to the molecule's level structure. As different molecules have their own signature level structures, the photon backscattering will be efficient only for a particular type of molecules, but not the others, even if they are in the same space and time, as long as Pump 1 402 and Pump 2 404 are prepared in appropriate amplitude and phase profiles. In applications, the profiles are obtained through global numeric optimization. In some embodiments, the optimization is performed in many successive steps by solving the level transition dynamics in FIG. 1a or 1b for different molecules for the given pump pulses created by the OAWG. In some embodiments, for each step, the pump pulses are modulated by randomly changing the phase and amplitude of their individual comb lines. The modulation is accepted and the pump pulses are updated only if the backscattering for the target molecules is enhanced while that for the others is suppressed. Otherwise, the modulation is rejected and the pump pulses remain unchanged. This step is applied recursively until reaching the desirable performance.

The backscattered photons will be measured directly either using a sensitive photon detector, such as "SPCM50A—Single Photon Counter Module" by Thorlabs Inc Newton, N.J., USA, or using the mode-resolving photon counter. The mode-resolving photon counter comprises of a quantum frequency conversion (QFC) device, a source of laser pulses, beamsplitters, optical filters, photon detectors, and data acquisition and circuit control devices. In some embodiment, the received signal photons are combined with the laser pulses using either a beamsplitter or an optical filter. In the QFC device, the signal photons' carrier frequency is converted if and only if they are in the desirable modes. The frequency-converted photons are picked using one or multiple optical filters, and detected in photon detectors. The laser pulses and any unconverted photons are dumped. The mode-resolving photon counter is designed such that only a single mode matching that of the backscattered signal photons is detected with high efficiency. Photons in all other modes are either not detected or detected with very low efficiency, even when they overlap with the signal photons. In some embodiments, this method improves the signal to noise ratio in the photon detection by over times from the ceiling performance achievable by ideal linear filters. This is realized by using an OAWG device to create pump pulses which interact efficiently in the QFC device with only a single time-frequency and spatial mode, the mode which the signal photons occupy, but not other modes, even those overlapping with the desirable signal mode. As a result, the signal can be well distinguished from background noises that arrive at the detection system at the same time.

This is crucial for the applications under ambient conditions, as the signal photons are sometimes accompanied by strong background noises from sunlight, blackbody radiation, random light sources, and so on. The single-mode photon detection distinguishes the signal from those photon noises, which extends the applicable distance of the present superradiant backscattering technique substantially, such as 10 km or further.

Figure 5:
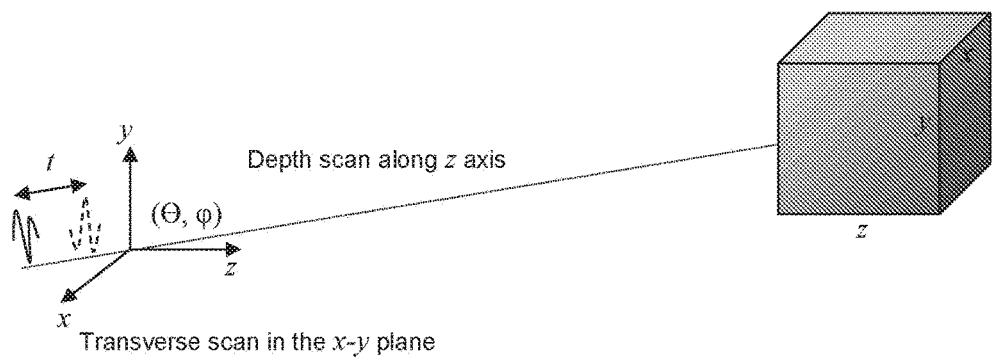
FIG. 5 is a schematic diagram illustrating an example of four-dimensional scanning of photon backscattering according to some embodiments of the present invention.

The coordinate and time where Pump 1 402 and Pump 2 404 meet, thus the occurrence of backscattering, is controlled by (1) the propagation directions of Pump 1 402 and Pump 2 404; and (2) the time and relative delay of launching Pump 1 402 and Pump 2 404. An illustration of this control is shown in FIG. 5 according to some embodiments. The x, y coordinate of the backscattering can be scanned by pointing the laser beams with ($\Theta$, $\phi$) launching angle relative to the z and x axis, respectively. In some embodiments, Pump 1 and Pump 2 are always launched along the same direction. In some embodiments, to scan the z coordinate of the backscattering, the chromatic dispersion of atmosphere is utilized. In one embodiment, for standard dry air at 15° C., 101 325 Pa and with 450 ppm $CO_2$ content, optical pulses at 1.6 micron wavelength travels faster than 0.5 micron pulses for about 1800 meters per second. By launching the faster pulse after the slower pulse with a relative delay t, the two pulses will meet at $L=t*c^2/\delta v$ from the place of launching, where $\delta v$ is the velocity difference of the two pulses in air and c is their average speed. Therefore, in order for the above two pulses to meet, for example, 10 km away, the 1.6 micron pulse needs to be launched 0.2 ns behind the 0.5 micron pulse in the above example. In one embodiment, scanning the relative delay between Pump 1 and Pump 2 can be realized using a programmable optical delay line, such as Motorized Optical Fiber Delay Lines from Newport Corporation (Headquarter at Irvine, Calif.). The spatial resolution over which the location of the backscattering occurs is determined by temporal widths of the pump pulses. If both the pump pulses have the same width $t_w$, then the resolution is about $t_w*c^2/\delta v$. In one embodiment, 1-ps pulse width gives 50 meter spatial resolution for the above 0.5-micron and 1.6-micron Pump pulses, and 0.1 ps width gives 5 meter spatial resolution.

The time lag between launching the pump pulses and receiving backscattered photons is about 2L/c, where c is the speed of light in atmosphere. In one embodiment, for probing events 10 km away, the delay will be about 60 microseconds. This means that for most applications, such as remote sensing and surface profiling, the scanning can be done effectively instantly, allowing probing and monitoring in real time.

In some embodiments, the propagation of light beams can be manipulated by modulating their spatial modes. In one embodiment, an Airy beam can propagate in a self-deflection fashion that its peak intensity follows a parabolic trajectory in free space, rather than along a straight line, without any external optical steering. There is a rich group of spatial mode modulations that can lead to exotic light propagation in atmosphere. With a Spatial Light Modulator, one can create the optimized spatial mode for a desirable light trajectory under practical conditions.

Figure 6:
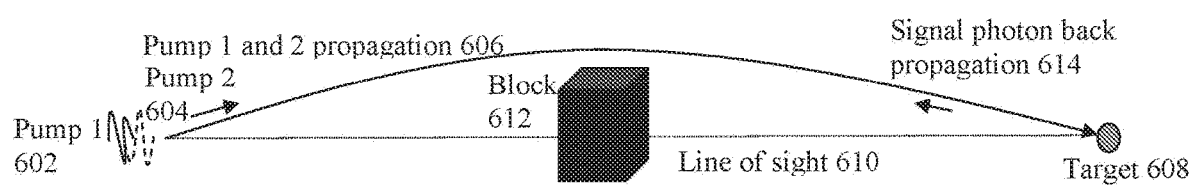
FIG. 6 is a schematic diagram illustrating an example of photon backscattering beyond line of sight according to some embodiments of the present invention.

FIG. 6 illustrates an example of photon backscattering beyond line of sight according to some embodiments. In order to probe gaseous materials not within light of sight, a Spatial Light Modulator is used to prepare Pump 1 and Pump 2 in modulated spatial modes so that their peak-power propagation obviates from straight lines to meet at a targeted space 608 that is not in line of sight, such as behind a wall.

In one embodiment, Pump 1 602 and Pump 2 604 are represented by solid and dashed pulse curves, respectively, with their peak intensities follow a non-straight line 606 around a block 612 in the line of sight 610. They will then interact and create backscattering signal photons via superradiant backscattering behind the block 612. In some embodiments, the signal is in the optical domain at comparable wavelength with the pump waves. Then, because of the superradiance effect, the signal photons will be created in the conjugate spatial mode of the pumps. Thus, their propagation 614 will be the reversal of the Pump 1 602 and Pump 2 604, allowing them to circumvent the block 612 and go back to the emitter where Pump 1 602 and Pump 2 604 are initially launched. In some embodiments, if the signal has a much longer wavelength that that in the optical domain, such as in the far-infrared to high frequency spectrum (wavelength in the range between 100 micron and 10 m), then its spatial mode will not replicate those of the pump waves. Rather than circumventing the block 612, a portion of it will be diffracted at or transmit through the block 612, depending on the size, shape, and material constituents of the block 612, and reach the emitter location.

Figure 7:
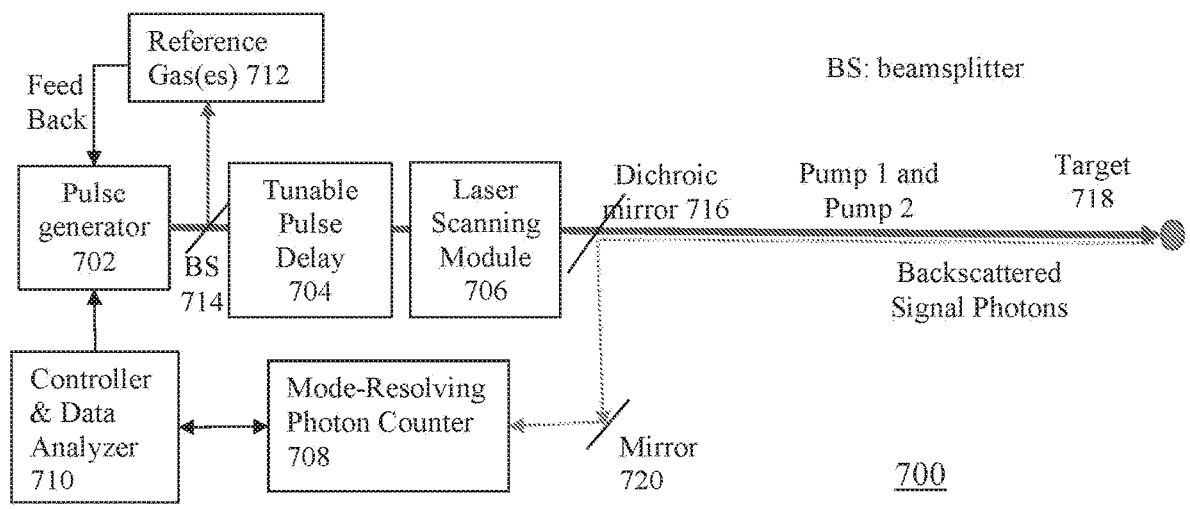
FIG. 7 is a schematic diagram illustrating an example of a system assembly for discriminative remote sensing and surface profiling according to some embodiments of the present invention.

A design of the system assembly is shown in FIG. 7 according to some embodiments. One embodiment of the system includes (1) a Pulse Generator 702 to generate co-propagating Pump 1 and Pump 2 (represented by the solid lines) in desirable time-frequency and spatial modes as described above; (2) a Tunable Pulse Delay 704 to adjust and scan the relative delay of Pump 1 and Pump 2, as described above; (3) a Laser Scanning Module 706 to point the pumps in the target direction; (4) a Mode-resolved photon counter 708 to detect the backscattered signal photons while also rejecting background photons; (5) a Controller and Data Analyzer 710 to control all components and analyze the data; and (6) an optional calibration and feedback module, where a small fraction of the generated Pump 1 and Pump 2 are sent to Reference Gas(es) 712 that contain sample gaseous chemical compounds to be measured. By detecting backscattered photons by the Reference Gas(es) 712, the efficiency of backscattering by Pump 1 and Pump 2 is monitored and calibrated in real time. Furthermore, the measurement can be used as feedback for optimizing the amplitude and phase profiles of Pump 1 and Pump 2.

FIG. 8 is a flowchart illustrating steps performed using the system described in FIG. 7 according to some embodiments. The method begins with step 802 in which the Pulse Generator 702 of the system in FIG. 7 generates co-propagating pump pulses in desirable time-frequency and spatial modes. At step 804, the generated pump pulses are split into two portions by passing through a beamsplitter 714. A small fraction of them is directed to interact with a sample of Reference Gas(es) 712, whose backscattering is measured. The measurement results are fed back to the Pulse Generator 702 to optimize the pulse properties of pump pulses for efficient backscattering. At step 806, a majority of pump pulses transmit through the beamsplitter 714 and are relatively delayed in the Tunable Pulse Delay 704 as described above. The relatively delayed pulses are further adjusted and scanned according to some embodiments. At step 808, the relatively delayed pump pulses are then launched to free space along a desirable direction using the Laser Scanning Module 706. Then the pump pulses are transmitted through a dichroic mirror 716, which transmits the pump waves but reflects the signal wave. At step 810, in the target space 718, if the target gas molecules are present, a signal wave will be backscattered efficiently via superradiance enhancement. The backscattered signal photons will be reflected at the dichroic mirror 716 and steered with additional mirrors 720 into the Mode-resolved photon counter 708, where they will be filtered and detected at step 812. The detection results will be fed to the Controller and Data Analyzer 710, where the amount and properties of detected signal photons, the background noise level, the coordinate of the target location, the arrival time of the signal photons, and other desirable information are recorded as the pump waves are transversely scanned and relatively delayed.

Exploiting the molecule selective backscattering according to some embodiments of the system depicted in FIG. 7 and the method depicted in FIG. 8, this invention is used to reconstruct a 3D distribution of chemical compounds from distance, such as 10 km away or more, in real time. Based on the number of backscattered photons, the concentration of each gas is inferred. The entire procedure involves creating Pump 1 and Pump 2 in the optimized amplitude and phase profiles for each chemical compound of interest. Those profiles are obtained from a library of optimized profiles for each gas component that have been experimentally validated. For continuous system monitoring and calibration, the effectiveness of Pump 1 and Pump 2 is monitored and calibrated using the Reference Gas(es) 712.

In one embodiment, the 3D scanning for each chemical compound of interest will be performed sequentially. Once the entire scanning is finished, the measurement data will be aggregated and analyzed to form a 3D tomogram of each chemical compound. Based on the concentration and distribution of those compounds, the source, type, and nature of the gases can be derived.

In another embodiment, the system is used to remotely profile the surface of stealth objects. Pump 1 and Pump 2 are prepared to interact strongly with a certain gaseous constituent of the atmosphere, which, depending on the area and weather condition of application, can be nitrogen, oxygen, argon, carbon dioxide, or else. Starting from a shorter distance with good visibility, the relative delay between Pump 1 and Pump 2 is increased such that the photons overlap further and further away, i.e., the backscattering is scanned along positive z direction according to some embodiments as shown in FIG. 5. When there is no obstacle, backscattered photons will be continuously measured during the scan with nearly constant photon counting rate. However, when there is an obstacle, a sudden drop in the backscattered photon counts occurs, as the pump pulses are either absorbed or scattered so that they do not produce backscattered photons able to reach the photon detector. This indicates the existence of an object without detecting an emission or reflection of light from the object itself. By performing transverse scanning of the pump waves' launching angle and increasingly sweeping the relative delay between Pump 1 and Pump 2, the 3D surface profile of the object can be constructed by recording the sudden drop in the backscattered signal. In one embodiment of FIG. 5, for the pump waves launching at angle $(\Theta,\phi)$, where $\Theta$ and $\phi$ are relative to the z and x directions, respectively, if the backscattering signal disappear as the relative time delay between the two pump waves increases to t, the coordinate of the obstacle is calculated to be $x=L*\sin(\Theta)*\cos(\phi)$, $y=L*\sin(\Theta)*\sin(\phi)$, $z=L*\cos(\Theta)$, with $L=t*c^2/\delta v$ the traveling distance before the two pump waves meeting with each other. By scanning $(\Theta,\phi)$ via laser pointing and t using a tunable optical delay device, the coordinate information (x,y,z) of the obstacle can be obtained, which are connected to form a surface profile of the obstacle facing the emitter. The above method implements "negative imaging," as the 3D image is reconstructed based on the absence of backscattered photons. The above method is therefore unaffected by optical properties of the target object.

In one embodiment, the above imaging method is to detect stealth aircrafts. Such aircrafts utilize absorptive coating to suppress its reflection of radio waves and/or light waves. As the present negative imaging method does not rely on reflection, it can detect such aircrafts.

In another embodiment, surface profiling and identification of objects not within line of sight is realized in a manner similar to negative imaging, but applying spatial mode modulation to Pump 1 and Pump 2 to create photon backscattering beyond the line of sight, as described above.

In another embodiment, the system shown in FIG. 7 is used to simulate bullet trajectory due to gravity. The propagation of Airy beam experiences self-deflection such that its peak intensity follows a parabolic curve. The amount of self-deflection is controlled by its transverse mode profile. In this embodiment, Pump 1 and Pump 2 are prepared in Airy beam by using a phase modulator and a Fourier lens as described above. The modulator uses a phase mask such that the created parabolic propagation of the Airy beam coincident with that of bullets in air due to gravitation. This allows one to simulate the bullet trajectory and directly aim at distant object without the extra step of computing the gravitational drop.

In another embodiment, the system shown in FIG. 7 is used in surface profiling and project identification under low visibilities or image distortions. Optical beams with appropriate spatial (transverse mode) modulation, such as some ring Airy beams, are robust during propagation through scattering, turbulent, and/or scintillation atmospheres. By preparing Pump 1 and Pump 2 with appropriate spatial modulation, surface profiles of distant objects can be reconstructed based on photon backscattering, even when visibility is low or the direct optical images are distorted due to atmospheric effects.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same While a number of embodiments of the present invention have been described, it is understood that these embodiments are illustrative only, and not restrictive, and that many modifications may become apparent to those of ordinary skill in the art, including that the inventive methodologies, the inventive systems, and the inventive devices described herein can be utilized in any combination with each other. Further still, the various steps may be carried out in any desired order (and any desired steps may be added and/or any desired steps may be eliminated).

What is claimed is:
1. A system for remote imaging, comprising:
 a waveform generator configured to generate co-propagating pulsed pump waves having shaped time-frequency modes, spatial modes, and group-velocity difference;

a pulse delay mechanism configured to relatively delay said pump waves for a predetermined time period, thereby creating delayed pump waves;

a launching module configured to launch said delayed pump waves to a free space along complementary, predetermined paths selected to thereby backscatter a plurality of signal photons when said launched pump waves overlap in said free space, in order to scan a target along a predetermined direction associated with said predetermined paths of said launched pump waves and across a time period associated with said predetermined time period of the relative delay of said launched pump waves;

a detector configured to detect said plurality of signal photons to thereby remotely obtain three-dimensional information of said target; and a computational processing unit communicatively coupled to said detector.

2. The system of claim 1, wherein said target is a specific type of gaseous molecule.

3. The system of claim 1, further comprising a library of optimized phase and amplitude profiles communicatively coupled to said waveform generator, wherein said waveform generator is configured to create said pulsed pump waves based on said optimized phase and amplitude profiles of said library.

4. The method of claim 3, wherein said detector is communicatively coupled to said library such that said library updates said optimized phase and amplitude profiles based on said plurality of signal photons.

5. The system of claim 1, further comprising a computer-readable non-transient memory configured to receive and store three-dimensional information from said detector, and configured to be read by said computational processing unit.

6. The system of claim 5, wherein said memory contains three-dimensional information on multiple targets.

7. The system of claim 6, wherein said computational processing unit is configured to generate a 3D tomogram based on said three-dimensional information on multiple targets.

8. The system of claim 1, wherein said launched pump waves are configured to effect Rabi oscillations in said target.

9. The system of claim 1, wherein said target is an object.

10. The system of claim 9, wherein said computational processing unit is configured to monitor said plurality of backscattered signal photons for sudden decreases and determine, through negative imaging, coordinates of said target so as to create a corresponding surface profile of said target.

11. The system of claim 9, wherein said object is a stealth object.

12. The system of claim 1, further comprising a spatial light modulator configured to modulate said launched co-propagating pulsed pump waves to be self-deflecting, wherein at least one of said predetermined paths follows a curved trajectory.

13. The system of claim 12, wherein said co-propagating pulsed pump waves comprise Airy beams.

14. The system of claim 1, wherein said launching module is configured to scan through use of the chromatic dispersion of Earth's atmosphere.

15. The system of claim 1, wherein said shaped time-frequency modes, said spatial modes, and said group-velocity difference of said co-propagating pulse pump waves are modulated such that a superradiant photonic backscattering effect of said plurality of backscattered signal photons is maximized.

16. The system of claim 1, wherein said co-propagating pulsed pump waves have a spectral band of from about 0.1 THz to about 10 THz.

17. The system of claim 1, further comprising a testing module configured to formulate proposed waveforms and test said proposed waveforms.

18. The system of claim 17, wherein said testing module is communicatively coupled to and receives input from said waveform generator.

19. The system of claim 18, wherein said testing module is configured to perform line-by-line modulation of comb lines of said proposed waveforms via a Global Searching Algorithm.

20. The system of claim 18, wherein said testing module is configured to test said proposed waveforms via recursive steps, starting with initial waveforms and randomly changing the amplitude and phase of comb lines of said initial waveforms, said comb lines constituting said proposed waveforms.

21. The system of claim 18, further comprising a reference gas sample, wherein said testing module is configured to perform real-time evaluation of said proposed waveforms by generating a test laser having said proposed waveforms, passing said test laser through said reference gas sample and measuring the excitation of said reference gas sample.

22. The system of claim 18, wherein said testing module is configured to test said proposed waveforms numerically by solving level transition dynamics.

23. The system of claim 18, wherein said testing module is configured to formulate and test said proposed waveforms by using global numeric optimization.

24. The system of claim 1, wherein each pump wave of said co-propagating pulsed pump waves has the same propagation speed.

25. The system of claim 1, wherein said launched pump waves have the same propagation speed but launch at angles to meet at a predetermined point in said free space.

26. The system of claim 25, wherein said predetermined intersection point is adjustable by varying said predetermined time period.

27. The system of claim 26, wherein said launching module is adapted to scan along said predetermined direction by varying said predetermined intersection point, modulating said pair of co-propagating pump pulses and/or varying at least one of said angles.

28. The system of claim 1, wherein said detector comprises a mode-resolving photon detector.

29. The system of claim 28, wherein said detector is configured to detect only a single, predetermined mode.

30. The system of claim 1, wherein said detector comprises a sensitive photon detector.

31. The system of claim 1, wherein said detector further comprises a quantum frequency conversion device; a source of laser pulses; a beam splitter; one or more optical filters; a photon detector; a data acquisition device; and a circuit control device.

32. The system of claim 31, wherein said quantum frequency conversion device is configured to convert only backscattered photons in said predetermined mode.

33. The system of claim 1, wherein said waveform generator further comprises a fiber polarization controller; a narrow-band laser; a frequency comb generator; a fiber optical amplifier; a waveform shaper; a fiber polarizer; a frequency-resolving optical gating; a fiber switch; and a frequency converter.

34. The system of claim 1, further comprising a camera configured to verify the spatial modes of said pump pulses.

35. The system of claim 34, wherein said camera is a charge-coupled device camera.

36. The system of claim 1, wherein said pulse delay mechanism comprises an optical delay line.

\* \* \* \* \*